(12) United States Patent
Balfanz et al.

(10) Patent No.: US 8,345,871 B2
(45) Date of Patent: Jan. 1, 2013

(54) FAST AUTHENTICATION OVER SLOW CHANNELS

(75) Inventors: Dirk Balfanz, Redwood City, CA (US); Philippe J. Golle, San Francisco, CA (US); Diana K. Smetters, Belmont, CA (US); Glenn E. Durfee, San Francisco, CA (US)

(73) Assignees: Palo Alto Research Center Incorporated, Palo Alto, CA (US); Samsung Electronics Co., Ltd., Gyeonggi-do (KR)

( * ) Notice: Subject to any disclaimer, the term of this patent is extended or adjusted under 35 U.S.C. 154(b) by 650 days.

(21) Appl. No.: 11/686,771

(22) Filed: Mar. 15, 2007

(65) Prior Publication Data
US 2008/0229110 A1   Sep. 18, 2008

(51) Int. Cl.
*H04K 1/00*   (2006.01)

(52) U.S. Cl. .......... 380/255; 380/39; 380/247; 380/257; 713/171; 713/176; 332/100

(58) Field of Classification Search .................. 380/259, 380/283, 285, 31, 34, 38–40, 247, 257, 275, 380/276; 713/171, 176, 194; 709/232, 233, 709/234, 235, 237, 246; 370/230.1, 231, 370/235, 236, 236.1, 236.2, 470, 471, 472, 370/474, 477; 332/101, 158, 100
See application file for complete search history.

(56) References Cited

U.S. PATENT DOCUMENTS

| | | | | |
|---|---|---|---|---|
| 5,241,599 A | * | 8/1993 | Bellovin et al. | 713/171 |
| 5,764,772 A | * | 6/1998 | Kaufman et al. | 380/30 |
| 6,009,176 A | * | 12/1999 | Gennaro et al. | 713/170 |
| 6,393,127 B2 | * | 5/2002 | Vogler | 380/283 |
| 6,539,479 B1 | * | 3/2003 | Wu | 713/151 |
| 7,142,674 B2 | * | 11/2006 | Brickell | 380/44 |
| 7,424,615 B1 | * | 9/2008 | Jalbert et al. | 713/171 |
| 7,502,471 B2 | * | 3/2009 | Malvar et al. | 380/223 |
| 7,606,366 B2 | * | 10/2009 | Petrovic | 380/205 |
| 2003/0012382 A1 | * | 1/2003 | Ferchichi et al. | 380/270 |
| 2005/0149730 A1 | * | 7/2005 | Aissi et al. | 713/168 |
| 2006/0109786 A1 | * | 5/2006 | Abdel-Kader et al. | 370/232 |
| 2006/0282675 A1 | * | 12/2006 | Yao | 713/176 |
| 2007/0121939 A1 | * | 5/2007 | Olesen et al. | 380/201 |

OTHER PUBLICATIONS

Aiello, W., Bellovin, S. M., Blaze, M., Canetti, R., Ioannidis, J., Keromytis, A. D., and Reingold, O. 2004. Just fast keying: Key agreement in a hostile internet. ACM Trans. Inf. Syst. Secur. 7, 2 (May 2004), 242-273. DOI= http://doi.acm.org/10.1145/996943.996946.*

* cited by examiner

*Primary Examiner* — Matthew Henning
*Assistant Examiner* — Daniel Potratz
(74) *Attorney, Agent, or Firm* — Marger Johnson & McCollom, PC

(57) ABSTRACT

A method of providing secure communications over a network includes receiving, at a receiving computer, a public key of a sending computer, and a hash of a sending random number over a first communication channel, transmitting, from the receiving computer, a public key of the receiving computer and a receiving random number provided by the receiving computer over the first communication channel, and receiving, at the receiving computer, the sending random number provided by the sending computer over the first communication channel.

16 Claims, 6 Drawing Sheets

US 8,345,871 B2

FAST AUTHENTICATION OVER SLOW CHANNELS

BACKGROUND

One approach to self-securing Voice over Internet Protocol (VoIP) phone calls involves the users transmitting their public keys as 'watermarks' embedded in the VoIP voice streams. The system manipulates frequency bands of the users' voices to allow the receiving endpoint to decode the frequencies into a series of bits. In some instances, these bits constitute a hash of a public key. This hash may represent a hash of a previously-exchanged public key.

For example, User A and User B exchange their public keys in a fast channel. Note that the term 'channel' may just comprise a particular bandwidth on a physical channel. When User A calls User B, user A's transmitting endpoint manipulates the frequencies of User A's voice in such a manner that the manipulation does not degrade User A's voice signal to the point where User B would hang up, but allows the receiving endpoint at User B to decode a series of bits from the signal. In this example, the series of bits constitutes a hash of User A's public key. User B can use the hash to acquire a second instance of User A's public key, then compare the second instance to the first instance previously acquired and confirm that User A is really User A.

A vulnerability in this approach may arise because the transmission of the hash of the public key occurs in a 'slow' channel. The 'slow' channel may actually be the same physical channel as the fast channel, it is just utilized at a much lower bandwidth because of the nature of the imprinting process. Due to the slower transmission, it is possible that a man in the middle may generate a hash that collides with User A's hash, and then can use that to intrude into the conversation before the complete imprint has occurred. The longer the imprint takes to transmit, the longer an attacker can successfully attack a conversation until the attacker's presence is detected. The ability to use a faster authentication would shorten the window of attack, allowing faster identification of attacks.

SUMMARY

Brief Description of the Drawings

Embodiments of the invention may be best understood by reading the disclosure with reference to the drawings, wherein.

DETAILED DESCRIPTION OF THE EMBODIMENTS

Figure 1:
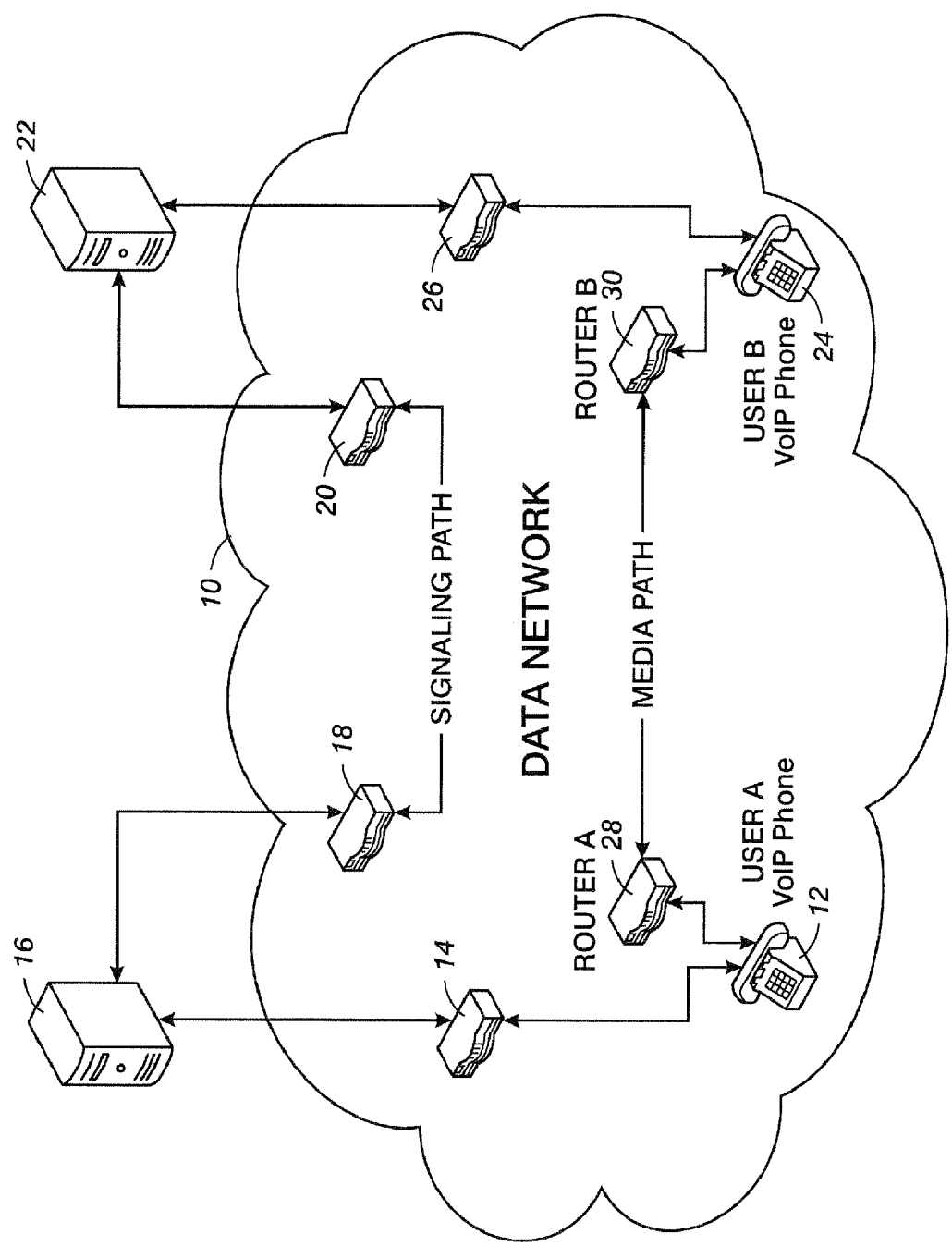
FIG. 1 shows an example of a VoIP network used to make a VoIP call.

FIG. 1 shows an example of a Voice-Over-Internet-Protocol (VoIP) network. VoIP, as used here, will refer to any voice over data networks call. For user A at phone 12 to make a call to user B at phone 24, the two phones must find each other and convey signaling information. The two endpoints 12 and 14 register with their respective VoIP providers 16 and 22. When user A calls user B, user A's VoIP provider 16 contacts user B's VoIP provider 22. VoIP provider 22 knows the location of user B and forwards the call to user B's phone 24. This setting up and forwarding forms a signaling path.

When user B answers the call, the endpoint 12 and 24 set up a 'direct' connection or media path for delivery of the audio data. Note that the calls from user A's phone to the VoIP provider 16 may travel through one or more routers such as 14. The signaling path may also involve one or more routers such as 18 and 22. The media path may form a 'direct' connection in that the VoIP providers no longer participate in the connection, the connection may also involve one or more routers such as 28 and 30 in the call.

Due to the open nature of the paths involving several different intermediate points such as the router, both the signaling and media paths have vulnerabilities to attackers. One solution involves the use of a public-key infrastructure (PKI). However, the two users would have to participate in the same PKI, normally reserved for users within the same system. If the users reside in the same system, the system is closed and end-to-end security exists generally.

In an open system, absent such a PKI, users can perform a "key exchange". In such a key exchange, each user has two keys, a public key and a private key. The user gives the public key to parties who want to send the user secured information. The sender encodes the information with the recipient user's public key, allowing the user to decode the information with the private key. In order for information to be exchanged, both users must provide the other with the respective user's public key.

If there is a pre-arranged secure channel for the key exchange between the sender and the recipient, end-to-end security is provided. However, as VoIP becomes more prevalent, more users will be calling more recipients without pre-arranged key exchanges, and will have to engage in unauthenticated key exchanges to gain end-to-end security. In the current state of the art, such unauthenticated key exchanges are susceptible to MIM attacks.

Figure 2:
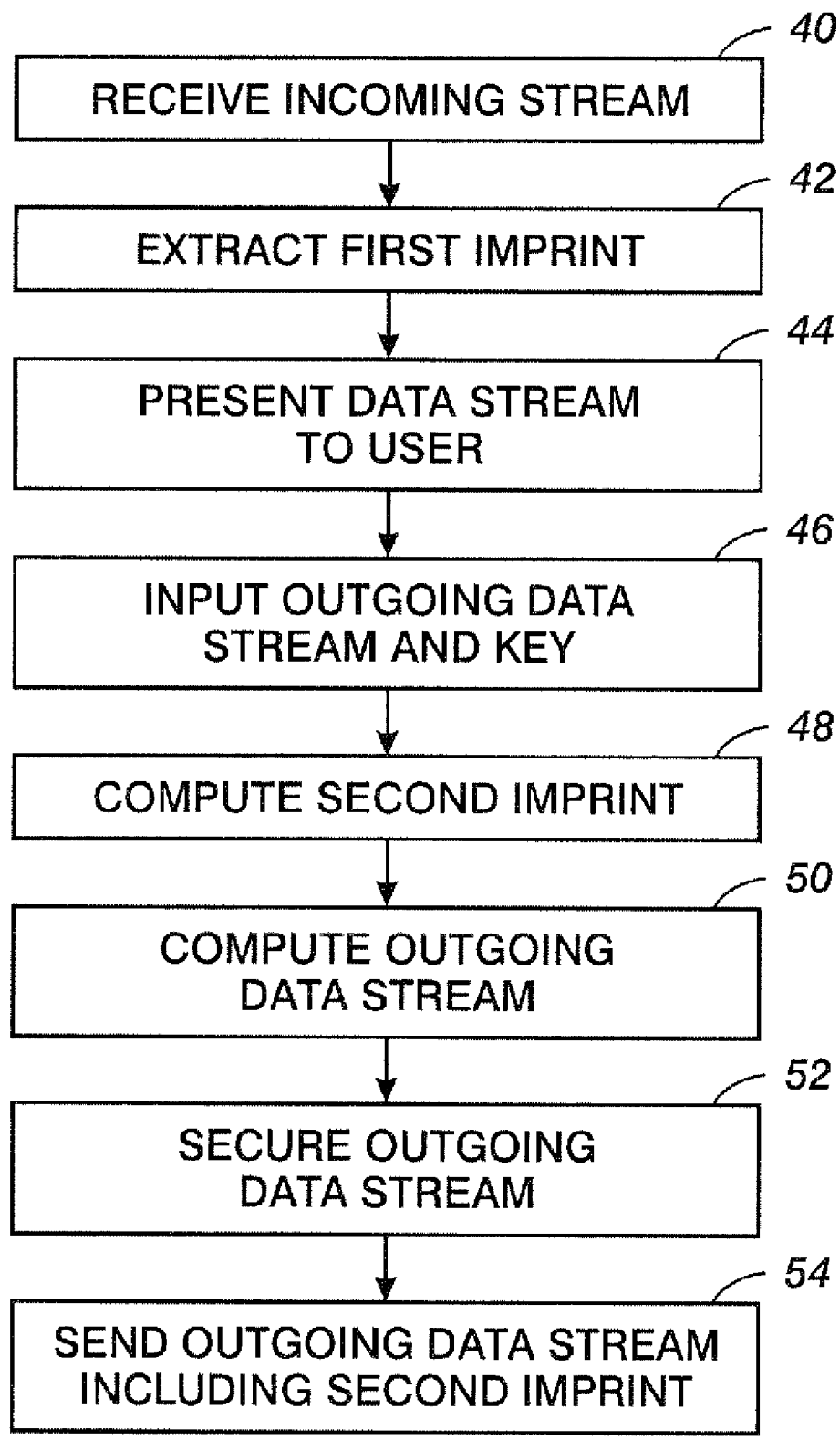
FIG. 2 shows an example of a method of receiving keys using key imprints at a receiving endpoint.

The present disclosure describes a system in which key exchanges can be performed securely in the absence of a PKI or a pre-arranged secure channel. FIG. 2 shows an example of a process in which users exchange keys in a context in which no pre-arranged security or PKI existed. One must note that the term key as used here includes any type of encoding scheme or otherwise used to secure communications, including public/private key pairs, information about keys, including hashes of keys, nonces, certificates, keys including error correction, etc.

The system uses what will be referred to as key imprints in the data stream to authenticate the key exchange. Key imprints make it possible to detect man-in-the-middle attacks in certain special situations. A real-time audio conversation is one such situation. Key imprints rely on humans to consume the audio data in real-time and while doing so to verify the authenticity of the content, e.g., verify that the voice is indeed that of the anticipated caller, and that he or she participates naturally in the conversation (as opposed to a recording of the caller's voice).

Key imprints are similar to what is known in the art as watermarks, in that it should be hard for an attacker to remove an imprint. There are, however, some differences to watermarks. For example, key imprints may be noticeable in the data stream where key-imprinted audio may sound different from the original audio. Changing an imprint or adding a second imprint to a key-imprinted audio stream should substantially degrade the quality of the data stream such as an audio stream.

One must note that the term key imprint as used here includes any type of scheme used to encode keys or key-related information, including public/private key pairs; information about keys, including hashes of keys, nonces, certificates, and keys including error correction.

In FIG. 2, user B receives an incoming authenticated data stream from user A, comprising both an experiential data stream such as an audio stream and a key imprint. At 42, user B extracts the imprint associated with user A, imprinted in one of many methods discussed later. The system presents the experiential data stream, such as the phone call, to user B at 44. As user B responds, his phone generates an outgoing data stream. The system takes the outgoing data stream and user B's key and generates a second imprint at 48 and an outgoing authenticated data stream at 50.

In one embodiment of the invention, the imprint extracted from the incoming data stream comprises user A's public key. Using the imprint, the system then secures the outgoing, authenticated (imprinted) data stream using user's A public key at 52 to encrypt the outgoing, imprinted data stream to user A at 54.

Figure 3:
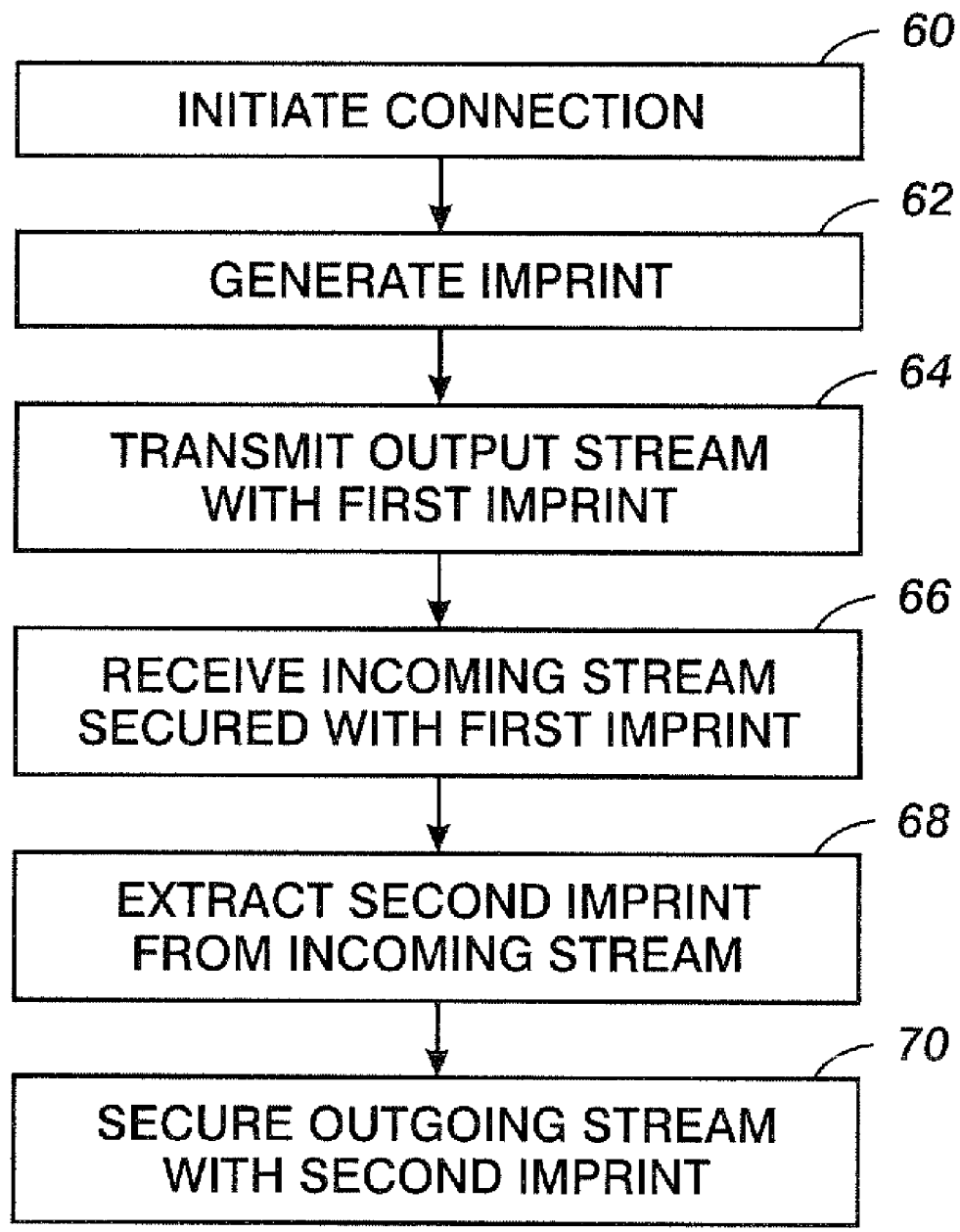
FIG. 3 shows an example of a method of sending keys using key imprints at a sending endpoint.

FIG. 3 shows an example of a method of securing communications from the sender's perspective. At 60, user A initiates the connection. At 62, user A generates the imprint. The user's phone or system 12 may generate the imprint in one of many ways.

In a first example, the system divides the user's voice signals up into high and low frequency subbands. For some predetermined interval, the system transmits only the high or low frequencies of user A's voice. In a simplified example, assume the user A's public key begins with the sequence of bits 0-1-1-0. The system transmits only the low frequency portion for 100 milliseconds (msec), then only the high frequency portion for 200 msecs, and then only the low frequency portion for 100 msecs. The receiving system could perform a frequency analysis for the frequencies received during a particular portion and extract the imprint of 0-1-1-0.

For a MIM attack, the attacker would have to change up the order of the bits to match his public key. For example, if the attacker uses a key of 0-0-1-0, he would have to replace the high frequencies of user A's voice with the corresponding low frequencies of user A's voice representing the same utterance. This low frequency information of the second portion of the stream does not exist in the stream, because user A transmits only the high frequencies for the second portion. The MIM attacker would have to perform an analysis on the first portion and approximate the low frequency of the second portion in a tenth of a second or less, a difficult if not impossible task.

An additional security measure occurs in this scenario because the data stream being received is an 'experiential' stream, experienced by a human user. In the case of a phone call, the user experiences an audio interaction. User B will notice if the second portion of the stream of user A's voice does not match the first. Matching does not refer to the matching low and high frequency subbands, as much as matching the sound of user A's voice. While the audio signal will degrade somewhat because of the missing subbands, user B would still recognize user A's voice.

In this manner, the user can monitor the security of the data stream in a more intuitive fashion, by the quality of the signal. Other techniques require that the user have high sophistication and knowledge to recognize an attack, such as where the user needs to ensure that the identity information exchanged in the metadata actually matches the metadata of the party to whom that user is speaking. Indeed, in approaches set out here, the user may actually react to the poor quality of the audio signal generated by a MIM attacker and hang up the call without any regards to security.

Figure 4:
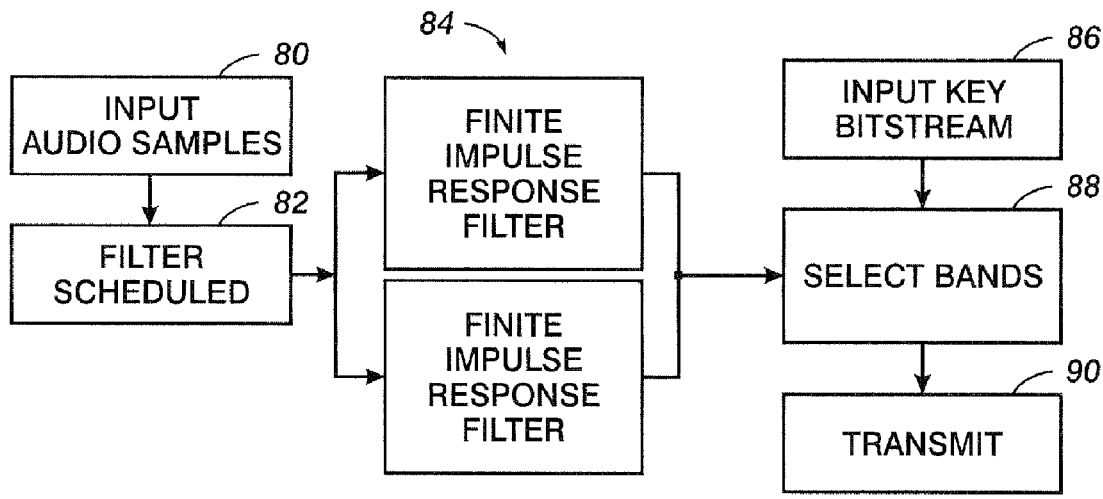
FIG. 4 shows an example of a frequency comb method of generating key imprints.

In implementation, however, using only the lower or high half of the frequency spectrum of a user's voice may make it difficult to recognize another's voice. Use of a frequency comb to divide the frequency spectrum into 'teeth' may alleviate this problem. FIG. 4 shows an example of this sending process.

At 80, user A speaks giving the system input audio samples. A filter scheduler or controller 82 directs the audio samples to a pair of frequency domain filters 84 such as finite impulse response (FIR) filters, each of which extracts a band of frequencies from the audio samples.

Meanwhile, the system receives as an input a key bit stream at 86. The key bit stream provides the data to select subbands of the frequencies at 88. In one example, the system separates the subbands into groups such that neighboring groups of subbands are put into separate groups, such as having eight bands of frequencies and putting subbands 1, 3, 5 and 7 into one group, and subbands 2, 4, 6 and 8 into another. The system then combines the bands into a single 'even' combination stream and a single 'odd' combination stream for transmission at 90. Transmission of one combination such as the even combination during a predetermined time interval would result in a '0' and transmission of the odd combination would result in a '1.' In this manner, the imprinted audio stream would not suffer as much degradation due to missing large 'chunks' of frequencies, but would result in a smoother audio transmission.

As a further security measure, the system may imprint one bit of the imprint over several phonemes. For example, consider a MIM attack in which the MIM has replaced B's public key with his own. The MIM now needs to alter the imprint on the audio coming from B to match. On average, the MIM's key fingerprint will differ in half of the bits from the imprint user B left on the audio. One way the attacker can send his imprint, instead of user B's, is to send along user B's unmodified audio whenever there is a bit in B's imprint that agrees with the attacker's, and send along older audio from Bob that encodes a bit of the attacker's choice if the bits do not match.

The audio that user A receives will sound something like the correct audio with minor degradation. The receiving phone will not notice a mismatch, because there is not one, and the MIM attack will have succeeded.

As a counter to this, the system may imprint one bit over several phonemes. In natural language, phonemes rarely last longer than 100 milliseconds. If the attacker wants to change the imprint from B's imprint to his, the audio heard may have words repeated and be disjointed and confusing. The users would probably just hang up the phone. Imprinting over several phonemes results in a degradation of the audio stream during a MIM attack that would cause the users to terminate the session.

In the media path, then, there are two 'paths' or channels. A set of protocols and transmission bandwidth allocation allows for fast, but insecure, transmissions, generally prior to the transmission of the media. The data imprinted on the media stream and transmitted comprises a 'slow' path, because the actual security data travels at a much slower rate. In actuality, these paths are generally the same, it is just the transmission speed and security of the messages that changes.

The system may need to synchronize between sending and receiver to avoid issues with lost packets. One embodiment employs timestamps associated with the packets to index into the imprint. Many protocols such as SRTP (Secure Real-time Transfer Protocol) employ timestamps to allow identification of a packet's place in a particular stream. These timestamps may allow the system to use the timestamps to track which bits of the key fingerprint is imprinted into the packets actually received.

Returning to the sending side and FIG. 3, once the system generates the imprint at 62, the outgoing stream with the first imprint transmits at 64. The receiver at user B then undergoes a process similar to that discussed with regard to FIG. 2, resulting in reception of an incoming stream at 66 by user A. The incoming stream is secured using user's A public key. The system at user A then decodes the stream using user A's private key. The second imprint is then extracted from the stream at 68. In one embodiment of the invention, the extraction of the second imprint provides user A with user B's key. Once user A has extracted user B's key, user A can transmit securely using user B's key at 70.

One embodiment of an imprint may include using a previously exchanged key. For example, if user A and user B exchange keys 'out of band,' in a channel other than the media path, or in the media path but using other protocols than media, the imprint may allow the users to verify that the person on the other end of the communication uses the correct key. For example, user A and user B exchange keys over a fast, but insecure channel. User A then begins to transmit using user B's key. Within the transmission, user A imprints a hash of user A's key. Using the imprint, user B's system secures the outgoing, authenticated (imprinted) data stream at step 52 in FIG. 2 by ensuring that the hash extracted from the imprint matches the hash of the key used to encrypt the outgoing data stream.

Figure 5:
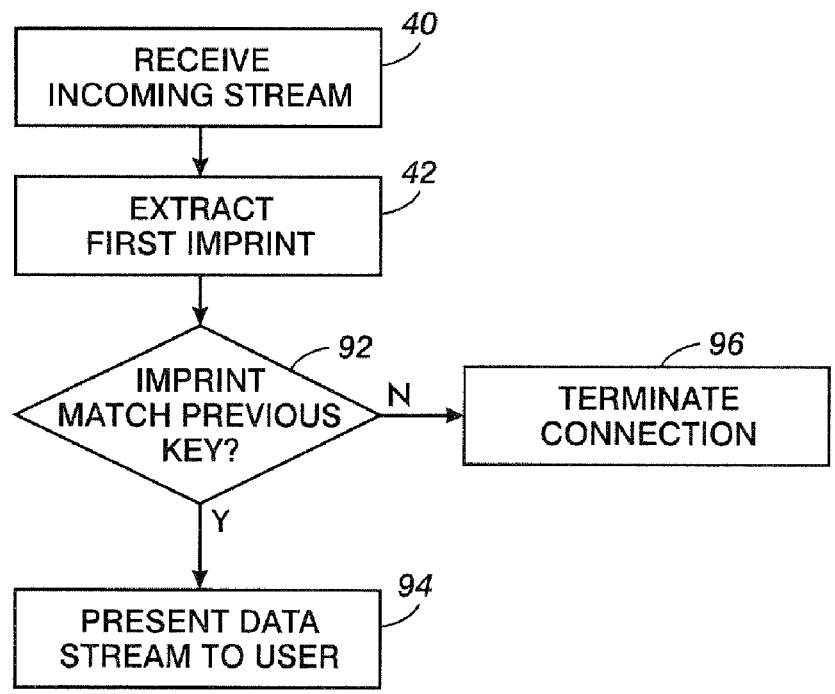
FIG. 5 shows an example of a method of using key imprints to verify previously exchanged keys.

Another embodiment of an imprint may include using keys that users A and B previously used to authenticate key agreement protocol messages, such as those found in the Diffie-Hellman mode of the MIKEY Multimedia Internet Keying protocol. In such an embodiment, users A and B would first engage in a key agreement protocol, signing their respective key agreement messages with private signing key, and sending their public signing key along to the other party. They then imprint their public signing keys, or hashes thereof, into their audio stream. Returning to FIG. 5, at 92, user B's system determines if the key received as an imprint matches the key A used to authenticate his key agreement messages to ensure that the other party is really user A. If the other party is really user A, the stream is presented to the user at 94, if the other party is no user A, the connection is terminated at 96.

In this scenario, a MIM may attack the media stream by generating a public key that hashes to the same imprint that a key used by the legitimate user. The attacker would not have to change the imprint on the audio at all. In one implementation, the system may use 160-bit SHA-1 (Secure Hash Algorithm) hash of the public keys. The best known way for an attacker to generate a public key that hashes to the same value as a given public key uses brute force.

In the above system, if it uses slow imprints, the 160-bit imprints will take a relatively long time to transmit to the other party. If one assumes 0.5 seconds per bit imprint, then 80 seconds of speech will transmit 160 bit. However, since one speaker will generally only speak half of the time in a conversation, and intervals of silence will occur in which no imprint bits transmit, the actual time it takes for both speakers to transmit their keys is 160 bits×0.5 second/bit×2×1.2 (assuming 20% silence)=192 seconds, or more than 3 minutes.

Three minutes is a rather long time. Using the same assumptions above with regard to silence and speaker time, an imprint rate of 0.2 seconds achieves 62-bit security, while 0.6 seconds per key imprint results in 21-bit security in 30 seconds of conversation. The number of bits of security correlates to how many keys the attacker must generate to break into your conversation. Twenty-one bit security means that the attacker has to generate $21^2$ keys, 62-bit security would result in $2^{61}$ keys.

Generating a 1024-bit RSA key pair takes a good deal of computing power. A 4 Ghz Pentium takes about 100 milliseconds to generate one key pair. To find a public key that hashes to the correct initial 10 bits requires, on average, $2^{12}/2$-2048 tries, and would introduce a call setup delay of approximately 20 seconds. Most users would terminate the call in response to such a delay.

Generally, because of the computing intensity of having to generate key pairs on the fly, attackers would probably generate large tables of public keys for quick access to find a key that hashes to a particular value. For example, 10-bit security would require $2^{10}$ keys, storable in 128 KB of memory. Twenty-bit security would require 128 MB of storage, 30-bit security would require 128 GB of storage, 40-bit security would require 128 terabytes of storage, and 50-bit security would require 128 petabytes of storage. Current storage capabilities make it infeasible for the attacker to store more than $2^{40}$ keys. This corresponds to a conversation length of 48 seconds, after which the users can be sure that they have thwarted attacks.

In the implementation above, where the users exchange keys across a fast channel and then imprint their keys on the media stream in a slower fashion, a MIM attacker could use this hash to pick a public key whose hash collides with that of a legitimate user. Each additional imprint bit received will reduce the attacker's probability of successfully launching an imprint collision attack by fifty percent.

It is possible to modify the imprint generation to include a 'salted' has of the public keys, where Imprint=$H(K_P\|s)$ for a 160-bit value s, where $\|$ denotes concatenation. The value s results from the concatenation of $s_A\|s_B$ exchanged in a modified version of the key exchange-imprinting protocol.

The imprints now depend not only on the keys of the communicating parties, but also on the random salt s. The communicating peers jointly determine the salt, and each must commit the contribution to the salt before leaning of the other's contribution. Therefore, the attacker cannot derive the peers' salts before committing to its own. As a result, the attacker cannot predict how the final, random imprints will look, until all of its choices for inputs to those imprints have been fixed. The attacker's probability of producing forged imprints that match the users' legitimate imprints on the first t bits is roughly the same as having a uniformly-randomly-chosen t-bit string match a fixed t-bit string, such as 1-in-$2^t$.

Figure 6:
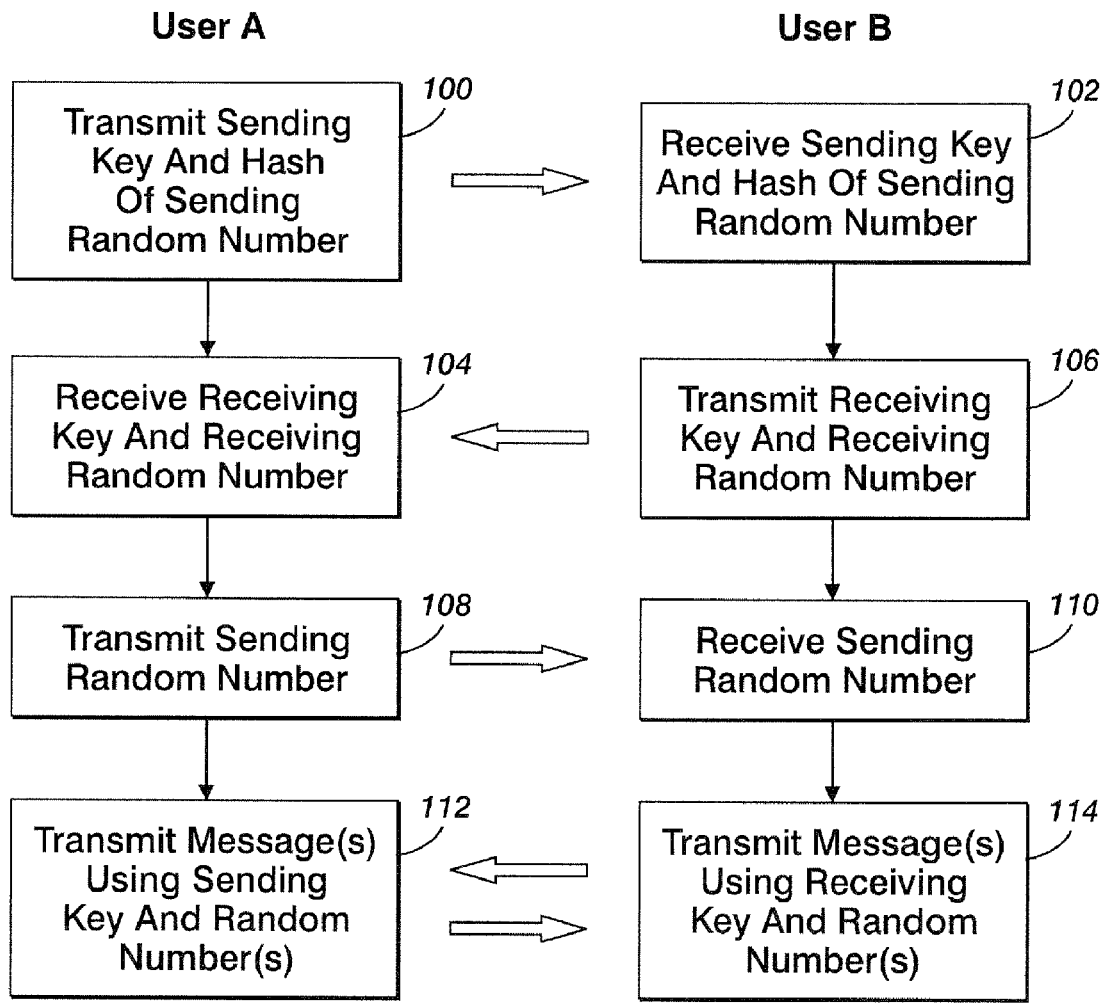
FIG. 6 shows an example of a method of exchanging keys and salts for self-securing media transmissions.

In the discussion of FIG. 6, User A is the sending user and User B is the receiving user, even though both parties send and receive. Designating the parties' keys and random numbers as 'sending' and 'receiving' helps to clarify the progression of messages. FIG. 6 shows a message diagram between user A and user B, while also showing the process for each user.

At 100, user A transmits a hash of user A's random number (the 'sending' random number), and user A's key (the 'sending' key). User B receives this message at 102. Knowing that user A has committed to its random number by sending the hash, user B transmits user B's key (the 'receiving' key) and user B's random number (the 'receiving random number) at 106. User A receives this at 104. User A, knowing that user B has committed to its random number, then transmits the sending random number at 108, and user B receives it at 110.

At this point, both users have each other's key and both salts, or random numbers. The random numbers are concatenated onto the end of either user's key and then the entire entity is hashed. These hashes are used in 112 and 114 to communicate between user A and user B. A MIM attacker would have to know both keys and both random numbers. If the MIM tried to attack user B and sent the wrong random number during the key/number exchange, user B would not be able to extract the correct random number from user A's hash and would know that there was an attack.

The first two exchanges shown in FIG. 6 may occur during a MIKEY exchange. The transmission of the sending random number would probably occur as an addition to the initial handshake in the media path. However the exchange occurs, the addition of random numbers to which the users must commit before receiving the other random number provides an efficient way to thwart a MIM attack in a slow transmission channel.

Figure 7:
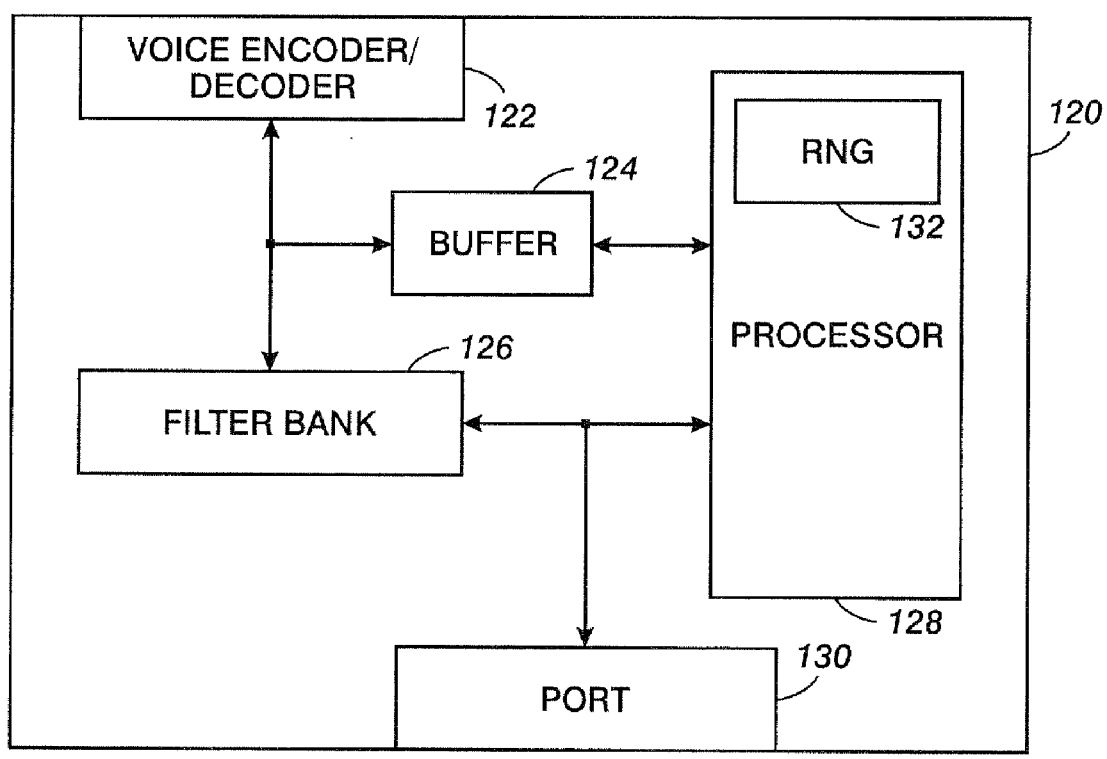
FIG. 7 shows an example of a device capable of performing key exchange using key imprints.

The systems that implement these processes may currently exist but merely require software to update their operations. Generally these devices will contain some sort of processor capable of executing instructions in the form of code. FIG. 7 shows an example of such a device.

The device 120 has a voice encoder 122. The voice encoder takes the natively analog signals of human voice and digitizes them into digital signals. These digitized input audio signals then travel to the filter bank 126 or other filtering structure for division into frequency subbands. Prior to dividing the digitized signals into subbands, the audio signal may undergo segmentation, with each segment corresponding to a particular length of time predetermined to be one bit interval for transmission. In that length of time, the combination of subbands transmitted will correspond to a 1 or a 0.

The processor 128 performs the selection of the subbands based upon the key bit stream. The buffer 124 or other memory structure may store the key bit stream for input to the processor, or the processor may retrieve it from elsewhere. The processor 128 operates on the voice stream to imprint the key bit stream into it, performs any further security, such as encoding it with a recipient's public key, and transmits the data stream through the port 130. As a receiving device, the processor receives the incoming stream, decrypts it if necessary, and extracts the imprint. The processor would also compare the key extracted from the imprint and ensure it matches the previously received key. The processor would probably also contain the random number generator (RNG) 132 that provides the unit's half of the salt.

The examples above have concentrated on audio voice signals as the experiential stream. However, other experiential streams may also benefit from these methods including audio/visual signals, other types of audio signals, video signals, etc. No limitation is implied nor should it be inferred from the above examples.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A computer-controlled method of providing secure communications over a network, comprising:

receiving, at a receiving computer, a public key of a sending computer, and a hash of a sending random number over a first communication channel;

transmitting, from the receiving computer, a public key of the receiving computer and a receiving random number provided by the receiving computer over the first communication channel;

receiving, at the receiving computer, the sending random number provided by the sending computer over the first communication channel; and receiving, at the receiving computer, a plurality of segments of a segmented digital voice stream, each segment corresponding to a predetermined length of time, imprinted with a salted hash of the public key of the sending computer and the sending and receiving random numbers imprinted across frequency sub-bands of the digital voice stream, wherein the digital voice stream is imprinted in that selected frequency sub-bands of each of the segments of the digital voice stream are transmitted and other frequency sub-bands of each of the segments of the digital voice stream are not transmitted as determined by the salted hash at the sending computer, wherein each of the received segments comprises at least one frequency sub-band; and analyzing the digital voice stream to identify which frequency sub-bands of the digital voice stream were received to extract the salted hash.

2. The computer-controlled method of claim 1, comprising storing, at the receiving computer, the public key of the sending computer and the receiving and sending random numbers.

3. The computer-controlled method of claim 1, comprising extracting the public key and the sending and receiving random numbers from the salted hash to determine if the public key and the sending and receiving random numbers match a previously stored version of the public key and random numbers.

4. The computer-controlled method of claim 1, comprising presenting the digital voice stream to a user.

5. The computer-controlled method of claim 4, further comprising presenting the digital voice stream such that tampering with the imprint degrades presentation of the digital voice stream.

6. The computer-controlled method of claim 4, the method comprising allowing a human to terminate the connection on such recognition of degradation of the digital voice stream.

7. The computer-controlled method of claim 1, wherein receiving a public key further comprises receiving one of a key, key information, a nonce, or a certificate with or without error correction.

8. The computer-controlled method of claim 1, wherein the hash further comprises a SHA-1 hash.

9. A computer-controlled method for securing communications over a network, comprising:

generating, at a sending computer, a hash of a sending random number over a first communication channel;

transmitting, from the sending computer, a public key of the sending computer and the hash of the sending random number over the first communication channel;

receiving, from a receiving computer, a public key of the receiving computer and a receiving random number over the first communication channel;

transmitting, from the sending computer, the sending random number over the first communications channel;

segmenting a digital voice stream into a plurality of segments, wherein each segment corresponds to a predetermined length of time;

dividing the digital voice stream into frequency sub-bands;

imprinting frequency sub-bands of the digital voice stream with a salted hash wherein bits of the salted hash determine which frequency sub-bands of each of the segments of the digital voice stream are transmitted and which frequency sub-bands of each of the segments of the digital voice stream are not transmitted, wherein the salted hash comprises a hash of the public key of the receiving computer and the sending and receiving random numbers, and wherein each of the segments comprises at least one frequency sub-band.

10. The computer-controlled method of claim 9, comprising storing, at the sending computer, the public key of the receiving computer and the receiving and sending random numbers.

11. The computer-controlled method of claim 9, comprising extracting the public key and the sending and receiving random numbers from the salted hash to determine if the public key and the sending and receiving random numbers match a previously stored version of the public key and random numbers.

12. The computer-controlled method of claim 9, comprising presenting the digital voice stream to a user.

13. The computer-controlled method of claim 12, further comprising presenting the digital voice stream such that tampering with the imprint degrades presentation of the digital voice stream.

14. The computer-controlled method of claim 13, the method comprising allowing a human to terminate the connection on such recognition of degradation of the digital voice stream.

15. The computer-controlled method of claim 9, wherein receiving a public key further comprises receiving one of a key, key information, a nonce, or a certificate with or without error correction.

16. The computer-controlled method of claim 9, wherein the hash further comprises a SHA-1 hash.

\* \* \* \* \*

UNITED STATES PATENT AND TRADEMARK OFFICE
CERTIFICATE OF CORRECTION

PATENT NO. : 8,345,871 B2
APPLICATION NO. : 11/686771
DATED : January 1, 2013
INVENTOR(S) : Dirk Balfanz et al.

It is certified that error appears in the above-identified patent and that said Letters Patent is hereby corrected as shown below:

In the Specifications:

Column 6, line 43, the word "leaning" should be replaced with --learning--.

Signed and Sealed this
Twentieth Day of August, 2013

Teresa Stanek Rea
*Acting Director of the United States Patent and Trademark Office*